United States Patent [19]

McCormick et al.

[11] 3,870,994

[45] Mar. 11, 1975

[54] GEOGRAPHIC ADDRESSING BY INTERROGATION FOR CONTROLLING AIRPORT GROUND TRAFFIC

[75] Inventors: Joseph L. McCormick; Charles G. McMullen; Phillip J. Woodall, all of Baltimore, Md.

[73] Assignee: The Bendix Corporation, Southfield, Mich.

[22] Filed: Dec. 22, 1972

[21] Appl. No.: 317,856

[52] U.S. Cl. .................... 343/6.5 R, 343/100 LE
[51] Int. Cl. .............................................. G01s 9/56
[58] Field of Search....... 343/6.5 R, 6.5 LC, 100 LE

[56] References Cited
UNITED STATES PATENTS
2,517,540  8/1950  Busignies .................... 343/6.5 R
3,449,745  6/1969  Holt, Jr. ....................... 343/6.5 R
3,760,415  9/1973  Holmstrom et al. ............ 343/7 ED OTHER PUBLICATIONS
Merrill I. Skolnik, Radar Handbook, McGraw-Hill, pp. 36-1 to 36-18, 1970.

*Primary Examiner*—T. H. Tubbesing
*Assistant Examiner*—G. E. Montone
*Attorney, Agent, or Firm*—W. G. Christoforo; Bruce L. Lamb

[57] ABSTRACT

The geographical location of on-the-ground traffic having on-board ATC transponders can be specifically addressed through the use of two spaced apart interrogators. A first interrogator transmits a first message at least over a field of interest except that a message null exists in a narrow beam. Transponders within the field of interest but outside the null beam are suppressed for a predetermined period of time while transponders within the null beam are not suppressed. A second interrogation subsequently transmits an interrogation along a second narrow beam. Only a transponder located within the geographical area defined by the intersection of the two beams are not suppressed and also illuminated by the interrogation and hence only that transponder responds.

7 Claims, 3 Drawing Figures

GEOGRAPHIC ADDRESSING BY INTERROGATION FOR CONTROLLING AIRPORT GROUND TRAFFIC

BACKGROUND OF THE INVENTION

This invention relates to the control of ground traffic, particularly at airports, through the use of standard air traffic control transponders.

Traffic control of taxiing aircraft at airports has traditionally been accomplished by controllers visually observing the airport situation from a control tower. At large, busy airports this method of operation is rapidly becoming inadequate. As a result, delays in the handling of on-the-ground traffic at airports has compromised improvements made in the handling of airborne traffic.

Primary high definition radar has been used to assist the controllers in locating and directing ground traffic. However, since primary radar does not provide positive identification of the various targets, it has not been accepted as widely as secondary radar has been accepted in the control of airborne aircraft. There are, however, substantial reasons why present day secondary radar transponders have not so far been used for the purpose of addressing ground traffic. The most severe of these reasons results from the length of the response message. The response message currently used comprises a pulse sequence which occupies twenty microseconds. Thus, if more than one airplane at an airport responds, garbling of the messages is bound to result.

Of course, it is known that positive identification is provided by interrogation of aircraft which contain a standard air traffic control transponder. It is also known that many aircraft already have installed therein or will shortly have installed such a transponder and that all these transponders will be compatible in a centralized air traffic control system, eliminating any possibility of missing or phantom aircraft on-the-ground if these transponders are used for ground control. In addition, it is desirable that these transponders be used for addressing ground traffic without any modifications or alterations thereto thus eliminating any extra cost to aircraft owners. If these transponders can be so used, there will be no down time of aircraft for modification of transponders and the lead time to implement a ground traffic control system which addresses the individual aircraft will only be that time required to install the fixed or ground portion of the system. In addition, the cost of implementing such a ground traffic control system would be much less than if each transponder had to be modified.

SUMMARY OF THE INVENTION

The present invention provides a means of using the present air traffic control transponders without modification or alteration for identifying and locating the craft in which the transponder is installed while the aircraft is on the ground even though in relatively close proximity with other aircraft. This is accomplished by means which interrogate at any particular time only a very small and specific geographic location on the airport. In particular, a first interrogator transmits a message which suppresses a receiving transponder for a predetermined period of time. The message is transmitted by illuminating at least the airport area with a radio signal having a narrow beam null, preferrably by steerable null techniques, so that the message is nulled within the narrow beam and transponders within the narrow beam are not suppressed. However, transponders outside the narrow beam are suppressed and cannot respond for a predetermined period of time even though interrogated during that period. A second spaced apart interrogator also illuminates the airport area with a radio signal having a narrow beam null, again preferrably by steerable null techniques. The radio signal transmitted by the second interrogator has the characteristic ability to interrogate transponders located within its narrow beam while temporarily suppressing transponders located outside its narrow beam. By this means only a transponder located within the geographical portion of the airport defined by the intersection of the two narrow beams will respond to the interrogation.

It is thus an object of this invention to provide means for identifying ground traffic at airports through the use of on-board ATC transponders.

It is another object of this invention to provide means for addressing airport ground traffic by interrogation of specific geographic areas.

It is a further object of this invention to provide means for geographic addressing by interrogation for the purposes of controlling and identifying airport ground traffic.

It is a further object of this invention to provide means of the type described which requires no or minimum alteration and modification of aircraft equipment normally used for other purposes.

A still further object of this invention is to provide means of the type described which will result in no or minimum downtime of aircraft while the means is installed and made operational.

A still further object of this invention is to provide means of the type described which can be installed and made operational at airports with minimum interruption of airport service.

These and other objects of the invention will be made obvious as the following description proceeds.

DESCRIPTION OF THE PREFERRED EMBODIMENT

Figure 1:
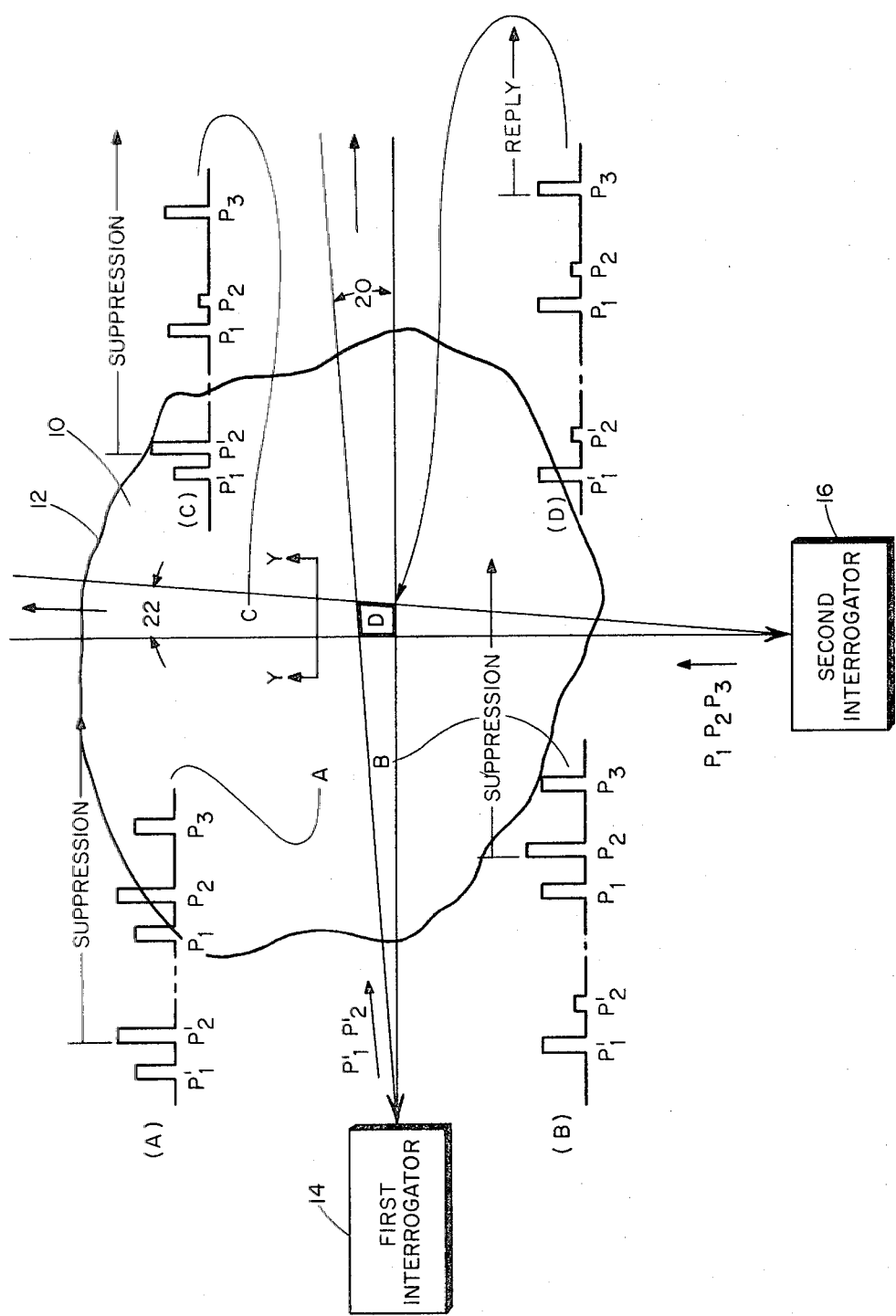
FIG. 1 shows the invention as used to interrogate specific geographic locations within a field of interest and additionally illustrates the field strength of the various signals at various points within the field of interest.

The known air traffic control radar beacon system (ATCRBS), as presently defined, includes a transponder mounted on each cooperating aircraft and ground stations which request information from all mounted transponders in a sphere of control-station-influence on a regular basis. At the present time, the information requested from the transponders may consist of aircraft identify, that is aircraft identification number, or altitude of the aircraft. After an aircraft has responded to an interrogation its location can be determined from the bearing and range computed at the ground interrogator. Bearing information is developed from the interrogator antenna pointing angle and range computed on turn around time, interrogator to transponder plus return. The system employs a two pulse interrogation code where pulse spacing determines the particular response or reply mode requested. A third pulse is inserted two microseconds following the first interrogation pulse and is used to suppress transponder replies on the sidelobes of the interrogator's antenna. This type of suppression is termed sidelobe suppression (SLS). The basic sidelobe suppression performance characteristics are as follows:

1. Suppression shall occur, that is no response will be made by the transponder, if the sidelobe pulse is equal or greater in amplitude than the first interrogation pulse.

2. Suppression shall not occur if the sidelobe pulse amplitude is 9 db or more below the first interrogation pulse. 3. Following the detection of a sidelobe pulse whereby suppression occurs, suppression shall be maintained for 35 plus or minus 10 microseconds.

The ATCRBS system further defines a mode 3 interrogation as a first pulse, P1, and a second pulse, P3, spaced at 8 microseconds. The aforementioned further pulse used for sidelobe suppression is termed pulse P2 and is located between pulses P1 and P3, two microseconds from pulse P1. Other ATCRBS interrogation modes having differennt pulse spacing are also used. However, since the ATCRBS system is well known to those skilled in the transponder art these further interrogation modes will not be described here, since they are unnecessary at the present time to a full explanation of the invention.

The ATCRBS interrogator, when in interrogation mode 3 transmits the aforementioned three pulses so that the field strength of pulse P2 within the sphere of control is greater than the field strength of pulses P1 and P3 except for a very narrow "lane" corresponding to the pointing angle of the interrogator wherein pulse P2 is at least 9 db less than pulse P1. The lane is generated by providing a narrow beam notch in the antenna (sometimes referred to as a monopulse pattern) for the transmission of P2. Transponders respond with the aircraft identification number when illuminated by the narrow beam notch while those transponders within the sphere of interest will be suppressed by the aforementioned sidelobe suppression scheme when not illuminated by the narrow beam. In this manner the aircraft within the sphere of interest are generally interrogated one at a time by pointing the narrow beam notch, either mechanically or electrically, in the direction of the aircraft (or vehicle) of interest. It is also known that if two aircraft lie on the same radial from the interrogator both these aircraft will be illuminated simultaneously by the narrow beam and hence will respond almost simultaneously with their aircraft identify numbers. When this occurs, the responses as received at the interrogator may overlap and thus be garbled. However, since the ATCRBS system is only used at the present time for interrogating airborne aircraft, normal separation of the aircraft will usually result in their responses being received at the interrogator ungarbled and recognizable.

If a transponder receives two pulses two microseconds apart, where the second pulse is equal or greater in amplitude than the first pulse, sidelobe suppression will occur at that transponder regardless of whether the P3 pulse is transmitted and received at the transponder or not. During the suppression interval (35 plus or minus 10 microseconds) all transponder replies to otherwise valid P1, P3 pairs, that is, pulses where pulse P2 is 9 db or more less in amplitude then pulse P1, will be suppressed.

Refer now to FIG. 1 which illustrates how the invention can be used to address and identify transponder equipped aircraft within a field of interest 10 which is bounded by line 12. Field of interest 10 might include, for example, that portion of an airport within which it is desired to address and identify aircraft. Suitably located about the periphery of the field are a first interrogator 14 and a second interrogator 16. Although only two interrogators are shown in this embodiment, it will be made obvious as the description proceeds that further interrogators can be used at any particular field of interest. However, it is only generally necessary that two interrogators cooperate with one another to address and identify aircraft within a predetermined geographical area. Each interrogator transmits, suitably using element phase and amplitude switching techniques to generate first a broad beam containing the P1 pulse to illuminate the entire field of interest and then a similar beam containing the P2 pulse at a different power level and incorporating a single notch or null. In the case of interrogator 16, a third broad beam containing the P3 pulse is then generated. The notch or null constitutes the narrow beam. Obviously these beams are transmitted from the various interrogators to produce the required pulse spacings. The narrow beam emanating from first interrogator 14 is bounded by lines 20 while the narrow beam emanating from second interrogator 16 is bounded by lines 22.

In this embodiment one interrogator, in this case interrogator 14, transmits the pulse pair separated by two microseconds and herein termed P'1 and P'2. The other interrogator, in this case interrogator 16, transmits the pulse triad P1, P2 and P3 wherein pulse p1 and P3 are separated by eight microseconds and pulse P2 is located between pulse P1 and pulse P3 and separated from pulse P1 by two microseconds.

Figure 2:
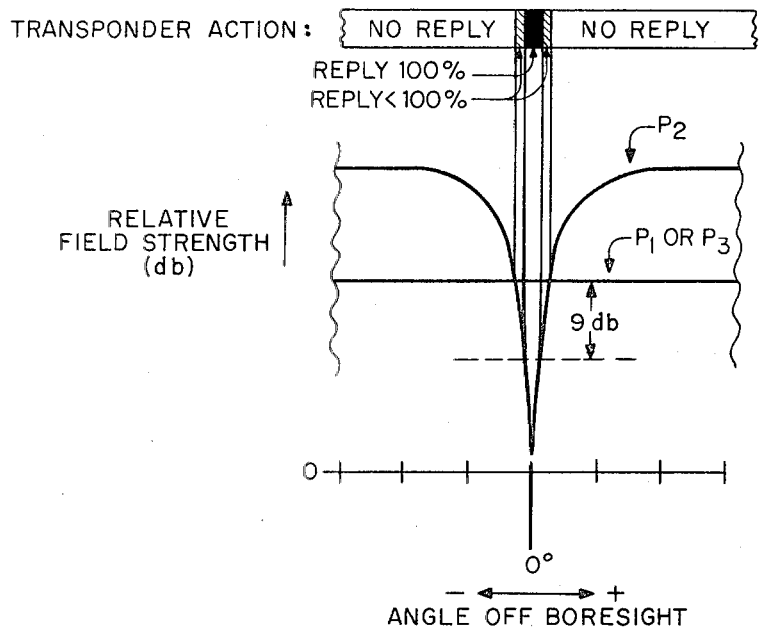
FIG. 2 illustrates the relative field strength of integrator signals versus angle off antenna bore sight.

The means for transmitting a narrow beam such as herein described are well known to those skilled in the art and need not be further described here. FIG. 2 shows the relative field strength along a line taken normal to one of the narrow beams such as line y—y in FIG. 1. It can be seen that in any angle off bore sight the relative field strength of pulse P2 is greater than the field strength of either pulse P1 or pulse P3. A transponder located off the narrow beam accordingly receives pulse P2 with a greater amplitude than pulse P1 and does not respond. A transponder on the bore sight within the narrow beam finds that pulse P2 is at least 9 db less than pulse P1 and accordingly will reply if it subsequently receives pulse P3. There is a gray area where the field strength of pulse P2 is less than the field strength of pulse P1 but is less than 9 db below pulse P1. For a transponder located in this gray area there is an uncertainty as to whether it will respond to interrogation. However, by using known steering techniques for steering the narrow beam it should be possible to steer the beam so that the transponder is located centrally in the beam once the transponder has been recognized. Of course, since pulse P3 is not transmitted by interrogator 14 it would not be included in a similar field strength diagram for that interrogator.

Return now to FIG. 1 where pulse train A represents the field strength of the signals transmitted from interrogator 14 and interrogator 16 at a point A which is outside of either beam 20 or 22. As can be seen, pulses P′1 and P′2 are received from the first interrogator 14 so that P′2 exceeds pulse P′1 in amplitude. Accordingly, a transponder located at point A will be suppressed upon the occurrence of pulse P′2 for a period of at least 25 microseconds. During this time the pulse triad is received from interrogator 16. However, since the transponder is suppressed during this interval there is no response to the pulse triad.

Now consider a transponder located at point B which is within beam 20, but outside of beam 22. At point B pulse P′1 and P′2 are received from interrogator 14 but since the transponder is located within the beam this interrogator pulse P′2 is at least 9 db less than P′1. A short time later the pulse triad is received from interrogator 16. Since the transponder is outside the beam of the second interrogator, pulse P2 is received with greater amplitude than pulse P1. Accordingly, the transponder will be suppressed by pulse P2 and will not respond to the interrogation.

Next consider a transponder located at point C, which is within beam 22 but outside of beam 20. At this point pulse P′2 is received from interrogator 14 with an amplitude greater than pulse P′1. Accordingly, the transponder is suppressed for at least 25 nicroseconds during which time the pulse triad is received from interrogator 16. However, since the transponder is suppressed it will make no response.

Consider now a transponder located at point D which is within the intersection of beams 20 and 22. At this point both pulses P′2 from interrogator 14 and P2 from interrogator 16 are attenuated greatly with respect to pulses P′1 and P1, respectively. Accordingly, upon receipt of pulse P3 the transponder will respond with its identification. Thus, considering these examples, it can be seen that only a transponder located within the intersection of the two beams will respond to an interrogation.

Consider again the transponder located at point B which is within beam 20 but outside beam 22. It can be seen that the pulse pair from interrogator 14 does not suppress the transponder in this situation. However, since pulse P2 is greater in amplitude than pulse P1 at this point the transponder is suppressed and no response is made. It should be noted that for a transponder located within beam 20 but outside beam 22 if pulse P1 is received eight microseconds aftr pulse P′1, that particular pulse pair will be interpreted as a P1, P3 pulse pair and an improper response will be made. It is thus necessary that the delay interval between the transmissions from interrogator 14 and interrogator 16 be such that no aircraft within beam 20 will receive pulse P1 eight microseconds after pulse P′1. Next consider a transponder located at point C which is within beam 22 but outside beam 20. In this case the pulse triad from interrogator 16 would ordinarily evoke a response from the transponder except that the transponder has been suppressed by the signal from interrogator 14 for at least 25 microseconds but not more than 45 microseconds as previously discussed. It is now obvious that a transponder located at point C must receive the interrogation from interrogator 16 during the suppression period so that no response will be made. The above considerations can limit the practical extent of the field of interest. However, certain means can be used by one skilled in the art to overcome these limitations and thus extend the field of interest. First note that these problems areas generally occur within one beam or the other. Those transponders located outside both beams can be suppressed by either the transmissions from interrogator 14 or interrogator 16. It is thus necessary to consider transponders located within one beam or the other in providing means for overcoming the aforementioned limitations. For example, the transmission from interrogator 16 can be delayed after the transmission from interrogator 14 by a time interval which is determined by the pointing direction of beams 20 and 22. Additional interrogators can also be used to extend the field of interest.

Figure 3:
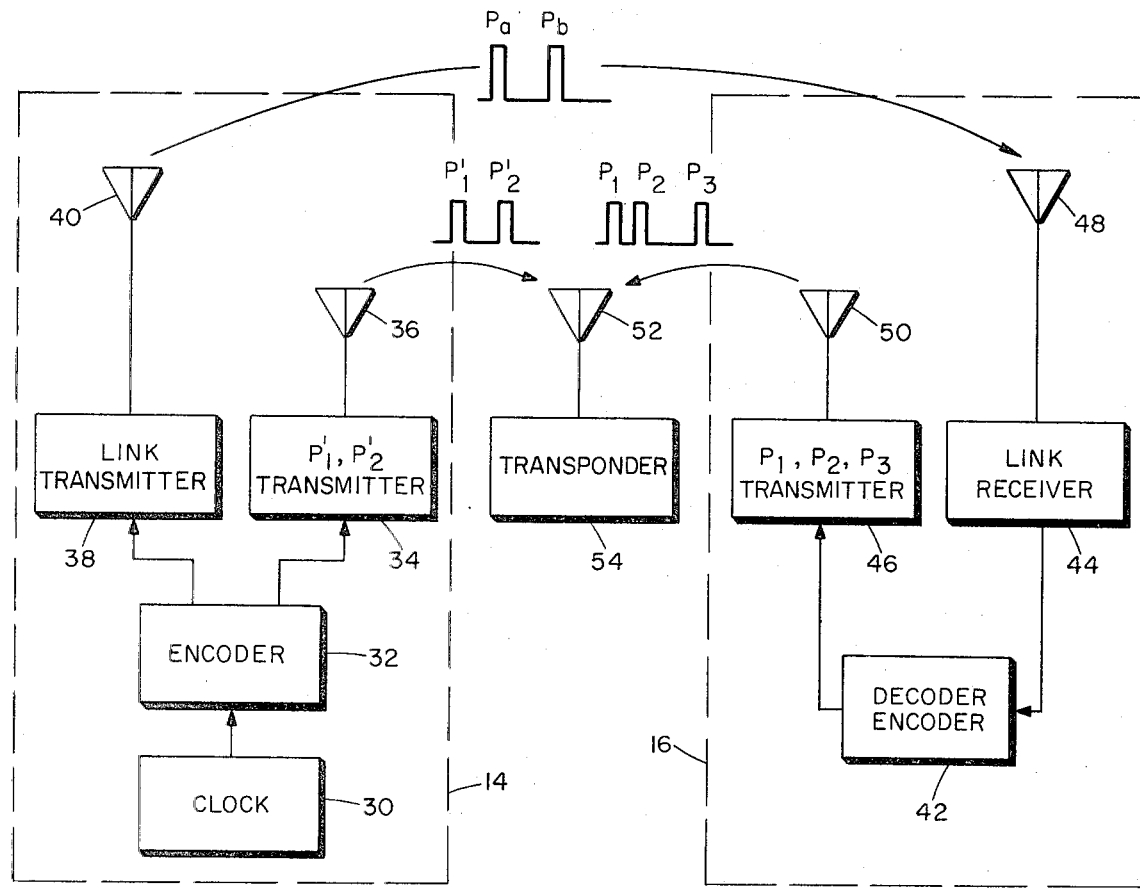
FIG. 3 is a block diagram which illustrates an embodiment of the invention wherein two interrogators are used.

Refer now to FIG. 3 which shows an embodiment of the invention. In this figure it is seen that the first interrogator 14 is comprised of a clock 30 and an encoder 32, in addition to transmitters 34 and 38 and antennas 36 and 40. Clock 30 is suitably a device which generates a timing mark in accordance with a predetermined schedule or in response to an external stimulus, the origin of which is not a part of this invention. Encoder 32 is suitably a delay line or other type device which generates time spaced pulses in response to the input timing mark. For example, encoder 32 might be a delay line having first and second output taps separated from each other by two microseconds and separated from the input to the delay line by a known predetermined amount, with these two taps being connected to transmitter 34, whereby pulse pair P′1 and P′2 are transmitted via antenna 36. In addition, the encoder might include further output taps whereat further coded pulses $P_a$ and $P_b$ might be available which are applied to a link transmitter 38 and transmitted via a directional antenna 40 to second interrogator 16. Interrogator 16 suitably includes a link antenna 48 for receiving pulses $P_a$ and $P_b$ from interrogator 14 and a receiver 44 which detects these pulses and applies them to a decoder-encoder 42. The pulses are therein decoded and since the distance between the two interrogators is known, the time of transmission from the first interrogator is also known upon decoding. Decoder-encoder 42 is suitably comprised of delay means having output taps and coincident gates to recognize the transmission from interrogator 14 and further output taps for generating the pulse triad to be transmitted from this interrogator.

Although a radio link has been shown for timing the transmissions from one interrogator with respect to another, other known means can also be used, as one example, a ground wire can be used where convenient instead of the radio link. The pulse triad P1, P2 and P3 is applied to transmitter 46 and transmitted by antenna 50. It should now be obvious that a transponder 54 located within the field of interest of interrogators 14 and 16 will receive the signals therefrom at its antenna 52 and will respond if the transponder is located at the intersection of the narrow beams from the various interrogators.

Although the disclosed embodiment of the invention was in an environment defined by current air traffic control standards, it should be obvious to one skilled in the art that alterations and modifications to the invention can be made within the teachings of the invention should the air traffic control standards be varied. Other alterations and modifications to the invention will also be apparent to one skilled in the art. Accordingly, the invention is to be limited only by the true spirit and scope of the appended claims.

Various means for determining the exact location of a responding transponder are available but do not comprise a portion of this invention. This means might comprise means for analyzing the azimuth angle of the antennas of the various interrogators so as to determine the intersection of their boresights. Other methods of determining the location of a responding transponder might include locating means for receiving a transponder reply at various points about the field of interest and determining the exact location of the transponder through triangulation methods.

The invention claimed is:

1. In a transponder system wherein a transponder is suppressed by a first received message for a predetermined period of time after said first message is received and wherein said transponder responds to a second received message so long as it is not suppressed, means for addressing a geographically individual portion of a field of interest comprising:

first means for transmitting said first message over said field of interest except along a first relatively narrow beam;

second means spaced apart from said first means for transmitting said second message along a second relatively narrow beam in said field of interest whereby said first and second beams intersect, the intersection of said beams being said geographically individual portion of the field of interest.

2. Means for addressing as recited in claim 1 wherein said second means for transmitting includes means for transmitting said first message over said field of interest except along said second beam.

3. The means for addressing as recited in claim 2 wherein said second means for transmitting is spaced apart from said first means for transmitting, said first beam being radiated from said first means and said second beam being radiated from said second means.

4. The means for addressing as recited in claim 3 wherein said second means transmits said first and second messages simultaneously and wherein said means for addressing includes means for delaying transmissions from said second means until a predetermined time after said first means transmits said first message.

5. The means for addressing as recited in claim 4 wherein said field of interest encompasses an airport and wherein said transponders are located on aircraft on the ground at said airport.

6. In a transponder system comprised of a plurality of transponders wherein each transponder characteristically is suppressed for a first predetermined period of time after a first message is received, said first message being comprised of a pulse pair separated by a second predetermined period of time and having a predetermined amplitude relationship, one with the other, and wherein each said transponder characteristically responds to a second received message so long as said transponder is not suppressed, said second message being comprised of a second pulse pair separated by a third predetermined time period, said third predetermined time period being longer than said second predetermined time period, means for addressing a geographically individual portion of a field of interest comprising:

first means for transmitting said first message over said field of interest except along a first relatively narrow beam;

second means spaced apart from said first means for transmitting a further message over said field of interest, said further message being comprised of a pulse triad, the first and second pulses in said pulse triad being separated by said second predetermined period of time and the first and third pulses of said pulse triad being separated by said third predetermined period of time, said second means for transmitting including means for nulling transmission of said second pulse along a second relatively narrow beam in said field of interest whereby a transponder located in the intersection of said beams will respond and a transponder located outside the intersection of said beams will not respond.

7. The means for addressing as recited in claim 6 and including means for synchronizing transmissions from said second means for transmitting with transmissions from said first means for transmitting whereby said second means for transmitting transmits a predetermined time after said first means for transmitting transmits.

* * * * *